United States Patent
Yamada

[19]

[11] Patent Number: 6,151,421
[45] Date of Patent: *Nov. 21, 2000

[54] IMAGE COMPOSING APPARATUS AND METHOD HAVING ENHANCED DESIGN FLEXIBILITY

[75] Inventor: Tomoko Yamada, Kanagawa-ken, Japan

[73] Assignee: Fuji Photo Film Co., Ltd., Minamiashigara, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/870,276

[22] Filed: Jun. 6, 1997

[30] Foreign Application Priority Data

Jun. 6, 1996 [JP] Japan .................... 8-144100

[51] Int. Cl.$^7$ .................................... G06K 9/36
[52] U.S. Cl. ................... 382/284; 382/305; 345/435; 358/540; 358/450
[58] Field of Search .................................... 382/284, 294, 382/305, 111; 358/450–453, 426, 540, 449, 296, 1–18; 395/117; 364/188, 479.03; 345/113–120, 326, 435; 348/77, 584–601; 700/103, 233; 707/526

[56] References Cited

U.S. PATENT DOCUMENTS

| | | | |
|---|---|---|---|
| 3,576,945 | 5/1971 | Ebeling ................................. | 348/343 |
| 4,261,012 | 4/1981 | Maloomian ............................ | 348/77 |
| 4,873,643 | 10/1989 | Powell et al. ......................... | 364/188 |
| 5,036,472 | 7/1991 | Buckley et al. ...................... | 364/479.03 |
| 5,452,094 | 9/1995 | Ebner et al. .......................... | 358/296 |
| 5,459,819 | 10/1995 | Watkins et al. ...................... | 395/117 |
| 5,479,603 | 12/1995 | Stone et al. .......................... | 345/326 |
| 5,608,542 | 3/1997 | Krahe et al. .......................... | 358/449 |
| 5,654,805 | 8/1997 | Boon ..................................... | 358/426 |
| 5,748,755 | 5/1998 | Johnson et al. ...................... | 382/115 |
| 5,815,645 | 9/1998 | Fredlund et al. ..................... | 395/117 |
| 5,867,282 | 2/1999 | Fredlund et al. ..................... | 358/450 |
| 5,937,081 | 8/1999 | O'Brill et al. ........................ | 382/111 |
| 5,963,214 | 10/1999 | Cok et al. .............................. | 345/435 |
| 5,986,671 | 11/1999 | Fredlund et al. ..................... | 345/435 |
| 6,069,637 | 5/2000 | Gaglione et al. ..................... | 345/435 |
| 6,073,145 | 6/2000 | Funabashi ............................. | 707/526 |

FOREIGN PATENT DOCUMENTS

| | | | |
|---|---|---|---|
| 2 235 347 | 2/1991 | United Kingdom ............ | H04N 7/18 |
| 2 246 929 | 2/1992 | United Kingdom ........... | H04N 1/387 |
| 2 215 554 | 9/1999 | United Kingdom ........... | H04N 1/387 |
| 82/04149 | 11/1982 | WIPO ............................ | G06K 19/08 |
| 86/07480 | 12/1986 | WIPO ............................ | G06K 19/00 |

*Primary Examiner*—Leo H. Boudreau
*Assistant Examiner*—Ishrat Sherali

[57] ABSTRACT

In an image composing apparatus, a desired image, which is selected from first digital images having been stored previously, and a desired image, which is selected from second digital images having been newly acquired, are combined with each other, and a digital composed image of a desired design is thereby obtained. The apparatus comprises several pieces of design defining information for specifying a size of the digital composed image, the desired first digital image, a position on a coordinate system associated with the digital composed image, at which position the desired first digital image is to be located, the desired second digital image, and a position on the coordinate system, at which position the desired second digital image is to be located. A specifying device specifies a single piece of design defining information from several pieces of design defining information. An image composing device forms the digital composed image of the desired design in accordance with the design defining information, which is specified with the specifying device.

18 Claims, 11 Drawing Sheets

FIG. 3A

```
###############################################################
# FORMAT DEFINITION FOR NEGATIVE INDEX EDITING  #
###############################################################

# FOR DISPLAY               FilmKind(1)
#                              ↓
NegaIndex    DispIndexList    0    Num              3      (2)
    .            .            0    1           DispName    NONE        (3a)
    .            .            0    1           FormatID    0           (3b)
    .            .            0    2           DispName    30 FRAMES
    .            .            0    2           FormatID    1
    .            .            0    3           DispName    40 FRAMES
    .            .            0    3           FormatID    2

.            .            1    Num              3
    .            .            1    1           DispName    NONE
    .            .            1    1           FormatID    0
    .            .            1    2           DispName    A TYPE
    .            .            1    2           FormatID    3
    .            .            1    3           DispName    B TYPE
    .            .            1    3           FormatID    4

# FOR EDIT                  FilmKind
#                              ↓
NegaIndex    EditIndexList    0    Num              2
    .            .            0    1           FormatID        1
    .            .            0    1           FrameNum        30
    .            .            0    1           IndexFormatId   1

.            .            0    2           FormatID        2
    .            .            0    2           FrameNum        40
    .            .            0    2           IndexFormatId   2

.            .            1    Num              6
    .            .            1    1           FormatID        3           (4a)
    .            .            1    1           FrameNum        15          (4b)
    .            .            1    1           IndexFormatId   3           (4c)

.            .            1    2           FormatID        3
    .            .            1    2           FrameNum        25
    .            .            1    2           IndexFormatId   4

.            .            1    3           FormatID        3
    .            .            1    3           FrameNum        40
    .            .            1    3           IndexFormatId   5

.            .            1    4           FormatID        4
    .            .            1    4           FrameNum        15
    .            .            1    4           IndexFormatId   6

.            .            1    5           FormatID        4
    .            .            1    5           FrameNum        25
    .            .            1    5           IndexFormatId   7

.            .            1    6           FormatID        4
    .            .            1    6           FrameNum        40
    .            .            1    6           IndexFormatId   8
```

FIG. 3B

```

# INDEX FORMAT

# 135-Nega 30P
           IndexFormat    1    Width              2008
           .              .    Height             1052
           .              .    BackGroundColor_R  255
                               (
                               )

# 135-Nega 40P
           IndexFormat    2    Width              3000
           .              .    Height             1052
           .              .    BackGroundColor_R  255
                               (
                               )

# SR-Nega 15P
           IndexFormat    3    Width              2008    (5)
           .              .    Height             1052    (6)
           .              .    BackGroundColor_R  255     (7a)
           .              .    BackGroundColor_G  255     (7b)
           .              .    BackGroundColor_B  255     (7c)
           .              .    FrameWidth         320     (8)
           .              .    FrameHeight        182     (9)
           .              .    Sort               0       (10)
           .              .    Parts      Num     4       (11)
# BIT MAP
           .              .         1  (12)  PosX    1728    (13)
           .              .         .        PosY    1051    (14)
           .              .         .        Rotation 270    (15)
           .              .         .        PartsNo  3      (16)
                                    Frames   Num     15      (17)
                                        1  (18) PosX  34     (19)
                                        1       PosY  49     (20)
                                        1       Rotation 0   (21)
                                        1       C     4      (22)
                                        1       H     5      (23)
                                        1       P     6      (24)
                                        1       N     7      (25)
                                                (
                                                )
```

FIG. 3C

```

#  FORMAT DEFINITION FOR FRAME IMAGE

                FormatId    Num    7   (26)
# 135 C
                        .    1   Width         268
                        .    .   Height        184
                        .    .   SeeThrough     0
                        .    .   OverlayInfo    1    Kind      0
                        .    .                  .    PosX      0
                        .    .                  .    PosY      0
                        .    .                  .    SizeX     0
                        .    .                  .    SizeY     0
                        .    .                  .    Color_R   0
                        .    .                  .    Color_G   0
                        .    .                  .    Color_B   0
                        .    .                  2    Kind      0
                        .    .                  .    PosX      0
                        .    .                  .    PosY      0
                        .    .                  .    SizeX     0
                        .    .                  .    SizeY     0
                        .    .                  .    Color_R   0
                        .    .                  .    Color_G   0
                        .    .                  .    Color_B   0

.    .                  8    Kind      0
                        .    .                  .    PosX      0
                        .    .                  .    PosY      0
                        .    .                  .    SizeX     0
                        .    .                  .    SizeY     0
                        .    .                  .    Color_R   0
                        .    .                  .    Color_G   0
                        .    .                  .    Color_B   0
                        .    .   Mask           0
                        .    .   MaskPosX       0
                        .    .   MaskPosY       0
                        .    .   MaskSizeX      0
                        .    .   MaskSizeY      0
                        .    .   MaskRotation   0
                        .    .   MaskConv       0
                        .    .   Number         1
                        .    .   NumberPosX     0
                        .    .   NumberPosY   152
                        .    .   NumberSizeX   52
                        .    .   NumberSizeY   32
                        .    .   NumberRotation 0
                        .    .   NumberConv     1
# 135 H

```
# SR C
    .       .       4       Width           320     (27)
    .       .       .       Height          182     (28)
    .       .       .       SeeThrough      1       (29)
    .       .       .       OverlayInfo     1       Kind        1       (31)    ⎤
    .       .       .       .               .       PosX        30      (32)    |
    .       .       .       .               .       PosY        0       (33)    |
    .       .       .       .               .       SizeX       260     (34)    |
    .       .       .       .               .       SizeY       2       (35)    |
    .       .       .       .               .       Color_R     0       (36a)   |
    .       .       .       .               .       Color_G     0       (36b)   |
    .       .       .       .               .       Color_B     0       (36c)   |
    .       .       .       .               2       Kind        1               |
    .       .       .       .               .       PosX        30              |
    .       .       .       .               .       PosY        180             |
    .       .       .       .               .       SizeX       260             |
    .       .       .       .               .       SizeY       2               |
    .       .       .       .               .       Color_R     0               |
    .       .       .       .               .       Color_G     0               | (30)
    .       .       .       .               .       Color_B     0               |
                                    ⎫
                                    ⎭
    .       .       .       .               8       Kind        1               |
    .       .       .       .               .       PosX        286             |
    .       .       .       .               .       PosY        2               |
    .       .       .       .               .       SizeX       2               |
    .       .       .       .               .       SizeY       178             |
    .       .       .       .               .       Color_R     255             |
    .       .       .       .               .       Color_G     255             |
    .       .       .       .               .       Color_B     255             ⎦
    .       .       .       Mask            1       (37)
    .       .       .       MaskPosX        0       (38)
    .       .       .       MaskPosY        128     (39)
    .       .       .       MaskSizeX       30      (40)
    .       .       .       MaskSizeY       27      (41)
    .       .       .       MaskRotation    0       (42)
    .       .       .       MaskConv        3       (43)
    .       .       .       Number          1       (44)
    .       .       .       NumberPosX      0       (45)
    .       .       .       NumberPosY      155     (46)
    .       .       .       NumberSizeX     30      (47)
    .       .       .       NumberSizeY     27      (48)
    .       .       .       NumberRotation  0       (49)
    .       .       .       NumberConv      2       (50)
# SR H
            5
# SR P
            6
# SR UNEXPOSED FRAME
            7
```

FIG. 3E

```

# PARTS

            Parts            Num    7    (51)

.           .             1    Kind         0
    .           .             .    Width        1052
    .           .             .    Height       230
    .           .             .    FileName     "135-30P.BMP"
    .           .             .    NumberConv   0

.           .             2    Kind         0
    .           .             .    Width        1052
    .           .             .    Height       592
    .           .             .    FileName     "135-40P.BMP"
    .           .             .    NumberConv   0

.           .             3    Kind         0           (52)
    .           .             .    Width        1052        (53)
    .           .             .    Height       325         (54)
    .           .             .    FileName     "SR-1.BMP"  (55)
    .           .             .    NumberConv   0           (56)

.           .             4    Kind         0
    .           .             .    Width        1052
    .           .             .    Height       325
    .           .             .    FileName     "SR-3.BMP"
    .           .             .    NumberConv   0
```

SR DATE OF PHOTOGRAPHING

```
    .           .             5    Kind         1
    .           .             .    Width        331
    .           .             .    Height       25
    .           .             .    FileName     ""
    .           .             .    NumberConv   4
```

SR FID

```
    .           .             6    Kind         2
    .           .             .    Width        380
    .           .             .    Height       37
    .           .             .    FileName     ""
    .           .             .    NumberConv   5
```

SR BAR CODE

```
    .           .             7    Kind         3
    .           .             .    Width        213
    .           .             .    Height       118
    .           .             .    FileName     ""
    .           .             .    NumberConv   0
```

FIG. 3F

```

# CONVERSION TABLE

             ConvTable      Num    5    (57)

# 135 FRAME NUMBER CONVERSION
     .         .        .   1    TableNo     1
     .         .        .        FileName    "135KOMA.RGB"
     .         .        .        Num         13
     .         .        .   1    C           "0"
     .         .        .   .    PosX        0
     .         .        .   .    PosY        0
     .         .        .   .    SizeX       12
     .         .        .   .    SizeY       28
     .         .        .   2    C           "1"
     .         .        .   .    PosX        12
     .         .        .   .    PosY        0
     .         .        .   .    SizeX       12
     .         .        .   .    SizeY       28

# SR FRAME NUMBER CONVERSION
     .         .        .   2    TableNo     2           (58)
     .         .        .        FileName    "SRKOMA.RGB" (59)
     .         .        .        Num         11          (60)
     .         .        .   1    C           "0"         (62)
     .         .        .   .    PosX        0           (63)
     .         .        .   .    PosY        0           (64)   (61)
     .         .        .   .    SizeX       12          (65)
     .         .        .   .    SizeY       25          (66)

# SR MASK CONVERSION
     .         .        .   3    TableNo     3
     .         .        .        FileName    "SRMASK.RGB"
     .         .        .        Num         3
     .         .        .   1    C           "0"
     .         .        .   .    PosX        0
     .         .        .   .    PosY        0
     .         .        .   .    SizeX       13
     .         .        .   .    SizeY       25
```

FIG. 3G

| # SR DATE CONVERSION | | | | | |
|---|---|---|---|---|---|
| . | . | 4 | TableNo | 4 | |
| . | . | . | FileName | "SRDATE.RGB" | |
| . | . | . | Num | 13 | |
| . | . | . | 1 | C | "0" |
| . | . | . | . | PosX | 0 |
| . | . | . | . | PosY | 0 |
| . | . | . | . | SizeX | 15 |
| . | . | . | . | SizeY | 25 |

| # SRFID CONVERSION | | | | | |
|---|---|---|---|---|---|
| . | . | 5 | TableNo | 5 | |
| . | . | . | FileName | "SRFID.RGB" | |
| . | . | . | Num | 14 | |
| . | . | . | 1 | C | "0" |
| . | . | . | . | PosX | 0 |
| . | . | . | . | PosY | 0 |
| . | . | . | . | SizeX | 38 |
| . | . | . | . | SizeY | 34 |

PRIOR ART

IMAGE COMPOSING APPARATUS AND METHOD HAVING ENHANCED DESIGN FLEXIBILITY

BACKGROUND OF THE INVENTION

1. Field of the Invention

This invention relates to an apparatus and a method for combining at least two images with each other. This invention particularly relates to an apparatus and a method for combining a newly acquired digital image and a digital image, which has been stored previously, with each other in accordance with a specified design.

2. Description of the Prior Art

Techniques for composing a single digital image of a desired design from digital images of photographs, characters, illustrations, and the like, and printing, displaying, or storing the composed digital image have heretofore been carried out in various fields. As an example of a method for specifying the desired design, a position and an attribute may be specified for each of the digital images on a display screen. In a different popular method for specifying the desired design, in cases where a single design is to be used repeatedly or in cases where the composition of many images must be carried out quickly, several pieces of defining information, which define different designs, are stored previously, and one of the several pieces of defining information is selected when necessary. A composing apparatus carries out a composition processing in accordance with the selected defining information.

A composing method and a composing apparatus are described in, for example, Japanese Unexamined Patent Publication No. 7(1995)-221975. This publication discloses an image composing and printing apparatus for business use, which are used for printing a digital image of a desired design on a greeting card, a T-shirt, a coffee cup, or the like. In the disclosed composing apparatus and method, several digital images (serving as first digital images) are stored previously. The digital images respectively have a plurality of output formats. The operator selects a desired format from the plurality of the output formats, and the digital image in the desired format is outputted. At this time, the output format is the one specifying a position on the first digital image, at which a digital image (serving as a second digital image) newly acquired with a scanner, or the like, is to be located. The position of the second digital image is specified as a position relative to the first digital image. In such cases, the first digital image has specific coordinates for the location of the second digital image. Therefore, in order for the second digital image to be located at one of different positions on the same first digital image, the first digital image must be stored previously with respect to each of the different positions of the second digital image.

With the disclosed composing apparatus and method, for example, in cases where a photograph of a soccer player is to be embedded between a pattern of a soccer ball and a pattern of a mascot of a corporation owning a professional soccer team, and the resulting composed image is to be printed on a T-shirt, a digital image, which is constituted of the pattern of the soccer ball and the pattern of the mascot of the corporation owning the professional soccer team, is stored previously for each of different corporations, and at least one output format for specifying the position of the photograph to be embedded is prepared for each of the digital images with respect to the different corporations. Specifically, even if the difference between the pattern for a corporation A and the pattern for a corporation B resides in the pattern of the mascot alone, the digital images, each of which contains both of the pattern of the soccer ball and the pattern of the mascot, must be stored previously.

The technique described above is efficient in cases where the kinds of the composed patterns are limited to a comparatively small number of kinds. However, in cases where a wide variety of designs are to be furnished such that various demands of customers may be satisfied, the problems described below are encountered. For example, as described above, in cases where a composed image for a new corporation owning a professional soccer team is to be obtained, even if only the pattern of the mascot varies between the composed image for the new corporation and composed images for other corporations, a digital image containing both of the pattern of the soccer ball and the pattern of the mascot of the new corporation must be prepared and stored previously as the first digital image. Also, in cases where a plurality of designs varying in relationship between the position of the soccer ball pattern and the position of the mascot pattern are to be furnished for a single corporation owning a professional soccer team, the first digital image must be prepared for each of the different relationships between the position of the soccer ball pattern and the position of the mascot pattern. Specifically, from the view point of the storage capacity and the time and labor required to support new first digital images, the kinds of the patterns and the formats must be limited to a comparatively small number of kinds. Therefore, with the technique described above, demands of customers cannot be satisfied sufficiently.

SUMMARY OF THE INVENTION

The primary object of the present invention is to provide an image composing apparatus, in which the range of designs capable of being furnished is not restricted by limitation of storage capacity and with which the demands of customers are satisfied sufficiently and quickly.

Another object of the present invention is to provide an image composing method, in which the range of designs capable of being furnished is not restricted by limitation of storage capacity and with which the demands of customers are satisfied sufficiently and quickly.

The present invention provides an image composing apparatus, wherein a desired image, which is selected from at least one first digital image having been stored previously, and a desired image, which is selected from at least one second digital image having been newly acquired, are combined with each other, a digital composed image of a desired design being thereby obtained, the apparatus comprising:

i) at least one piece of design defining information for specifying a size of the digital composed image, the desired first digital image, a position on a coordinate system associated with the digital composed image, at which position the desired first digital image is to be located, the desired second digital image, and a position on the coordinate system, at which position the desired second digital image is to be located, ii) a specifying means for specifying a single piece of design defining information from at least one piece of design defining information, and iii) an image composing means for obtaining the digital composed image of the desired design in accordance with the design defining information, which is specified with the specifying means.

In the image composing apparatus in accordance with the present invention, the design defining information may further specify a character pattern and/or a drawing graphic, which is to be embedded in the digital composed image, and a position on the coordinate system, at which position the character pattern and/or the drawing graphic is to be located. Also, the design defining information may still further specify an attribute of the character pattern and/or the drawing graphic, which is to be embedded in the digital composed image.

Further, in the image composing apparatus in accordance with the present invention, the second digital image may be a digital image obtained by digitizing a signal, which has been obtained by photoelectrically detecting an original image having been recorded on photographic film or printed matter, and the apparatus may further comprise a recording means for recording the digital composed image, which has been obtained by combining the digital image and the desired first digital image with each other with the image composing means, as a photographic print on a predetermined recording medium.

The present invention also provides an image composing method, wherein a desired image, which is selected from at least one first digital image having been stored previously, and a desired image, which is selected from at least one second digital image having been newly acquired, are combined with each other, a digital composed image of a desired design being thereby obtained, the method comprising the steps of:

i) preparing at least one piece of design defining information for specifying a size of the digital composed image, the desired first digital image, a position on a coordinate system associated with the digital composed image, at which position the desired first digital image is to be located, the desired second digital image, and a position on the coordinate system, at which position the desired second digital image is to be located, ii) specifying a single piece of design defining information from at least one piece of design defining information, and iii) obtaining the digital composed image of the desired design in accordance with the specified design defining information.

The term "first digital image having been stored previously" as used herein means a digital image which the image composing apparatus has recognized previously, i.e. an image which the image composing apparatus can specify uniquely. A storage device for storing the first digital image need not necessarily be provided in the image composing apparatus and may be an external auxiliary storage device, or the like. Also, no limitation is imposed upon the kind of the image.

The term "second digital image having been newly acquired" as used herein means, for example, an image having been read out with a scanner, or the like, an image obtained from a photo-CD, or the like, or an image transferred from a memory of a digital camera. In such cases, the image composing apparatus may allocate numbers to the images in the order, in which the images have been acquired, and may discriminate the images by the allocated numbers. Alternatively, a device for acquiring the images may allocate identifiers to the images, such that the image composing apparatus can discriminate the acquired images.

Specifically, when the design defining information is determined, the desired image, which is selected from the first digital images having been stored previously, is specified uniquely by the image composing apparatus. Also, the desired image, which is selected from the second digital images having been newly acquired, is specified with the order, in which the image is acquired, or with the identifier, which is allocated to the image in accordance with a certain rule. For example, in cases where the first digital images are illustrations of the twelve horary signs and the second digital images are photographic frames obtained with a film scanner, the image composing apparatus recognizes a digital image of a rabbit, which is one of the twelve horary signs, in accordance with the design defining information and recognizes the photographs, which are obtained with the film scanner, as first to twelfth frames of film regardless of what images are represented by the photographs.

The term "coordinate system associated with a digital composed image" as used herein means a coordinate system, which is set on the basis of the ultimate image obtained from the image composition. The coordinate system associated with the digital composed image is different from the one which is set on the basis of one of the images subjected to the image composition in accordance with the conventional technique.

The term "attribute of a character pattern and/or a drawing graphic" as used herein means the form, with which the character pattern and/or the drawing graphic is illustrated in the composed image, such as the size and font of the character pattern and rotation of the drawing graphic.

The term "preparing at least one piece of design defining information and specifying a single piece of design defining information from at least one piece of design defining information" means that one piece of design defining information may be altered in accordance with a desired design, or the design defining information may be processed as several pieces of defining information for different designs.

With the image composing apparatus and method in accordance with the present invention, the position of each of the images subjected to the image composition is not specified with respect to the coordinate system relative to one of the images subjected to the image composition and is specified with respect to the independent coordinate system, which is set on the image obtained from the image composition. In such cases, even if a background image having a large size is not stored previously, the image composition can be carried out. Therefore, the range of designs capable of being furnished is not restricted by limitation of storage capacity, and the demands of customers can be satisfied sufficiently and quickly.

Also, with the image composing apparatus and method in accordance with the present invention, besides the first digital image having been stored previously and the second digital image having been newly acquired, a character pattern and a drawing graphic can also be subjected to the image composition by specifying their attributes. Therefore, a wide variety of designs can be specified.

BRIEF DESCRIPTION OF THE DRAWINGS

FIG. 3A is a diagram showing a portion of an example of design defining information, FIG. 3B is a diagram showing a different portion of the example of design defining information, FIG. 3C is a diagram showing a further different portion of the example of design defining information, FIG. 3D is a diagram showing a still further different portion of the example of design defining information, FIG. 3E is a diagram showing another different portion of the example of design defining information, FIG. 3F is a diagram showing a further different portion of the example of design defining information, FIG. 3G is a diagram showing a still further different portion of the example of design defining information.

DESCRIPTION OF THE PREFERRED EMBODIMENTS

The present invention will hereinbelow be described in further detail with reference to the accompanying drawings.

An embodiment of the image composing apparatus in accordance with the present invention, which is described below, may be incorporated in an image reproducing apparatus disclosed in Japanese Patent Application No. 7(1995)-253050. With the disclosed image reproducing apparatus, a digital image, which has been obtained from an image read-out operation with a scanner from a reflection type of image storage sheet, such as photograph paper or printed matter, or a transmission type of image storage sheet, such as negative film or reversal film, is subjected to image processing, such as image size enlargement or reduction, and is then reproduced as a photographic print on a recording medium. As one kind of the reproduced print, an index print, i.e. a print comprising a plurality of photographic frames arrayed on a single print, can be obtained. In the embodiment described below, image composition is carried out in order to obtain an index print. As for the overall constitution of the image reproducing apparatus, reference may be made to Japanese Patent Application No. 7(1995)-253050.

Figure 1:
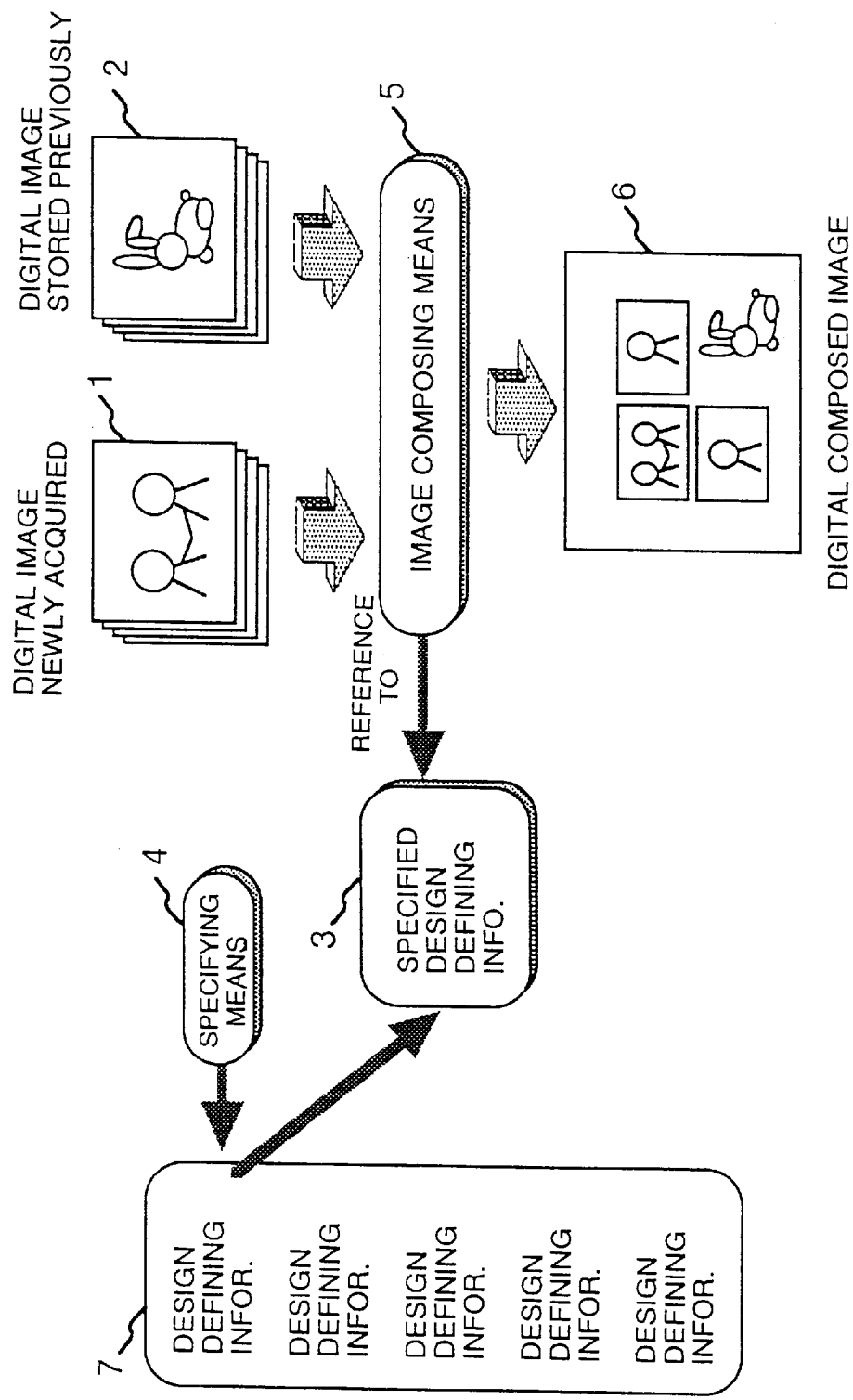
FIG. 1 is a block diagram showing how processing is carried out in an embodiment of the image composing apparatus in accordance with the present invention.

FIG. 1 shows how processing is carried out in the embodiment of the image composing apparatus in accordance with the present invention. With this embodiment of the image composing apparatus, a newly acquired digital image 1 and a digital image 2 having been stored previously are combined with each other by an image composing means 5, and a digital composed image 6 is thereby obtained. At this time, the image composing means 5 carries out the image composition in accordance with design defining information 3, which has been specified by a specifying means 4 from at least one piece of design defining information 7 having been defined previously.

Figure 2:
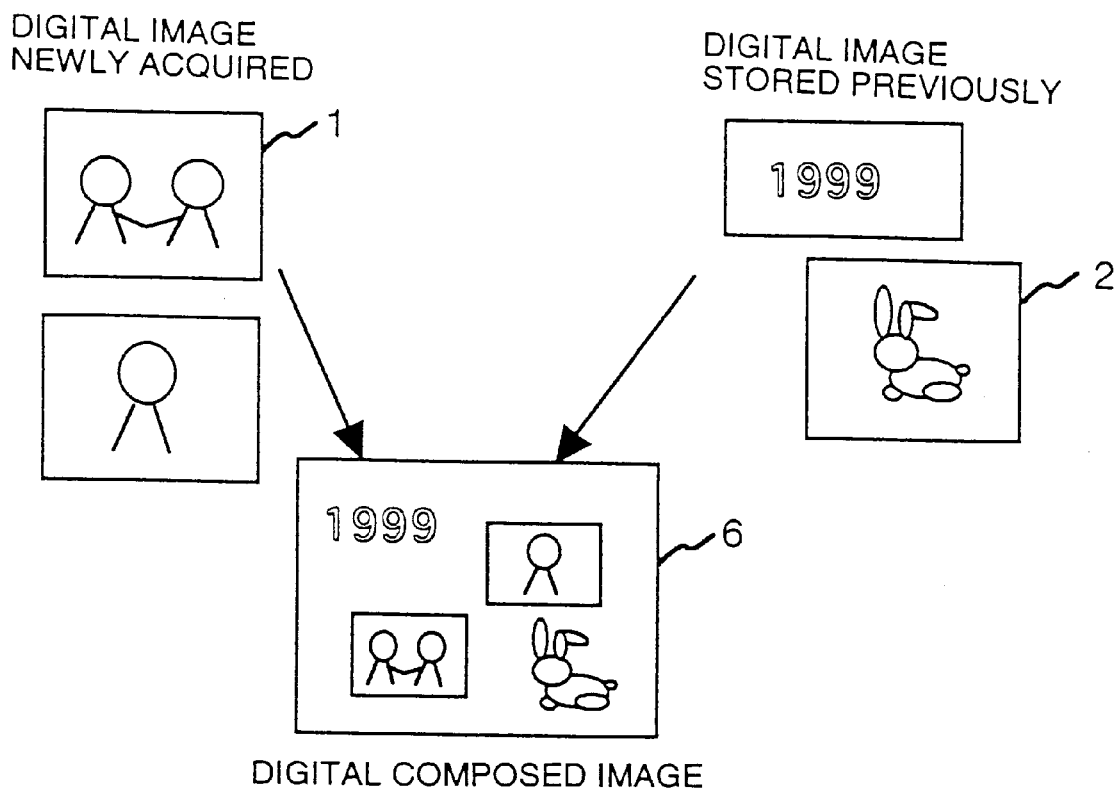
FIG. 2 is a block diagram showing how an image is composed with the embodiment of the image composing apparatus in accordance with the present invention.
Figure 6:
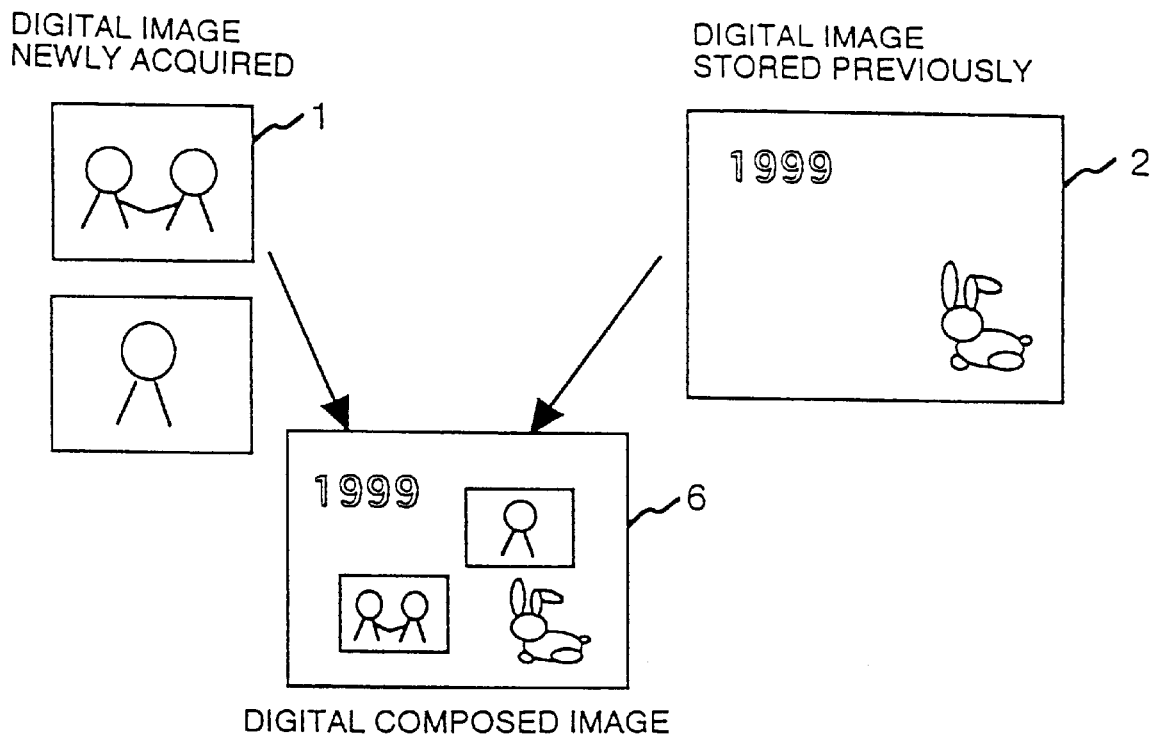
FIG. 6 is a block diagram showing how an image is composed with a conventional technique.

The digital image 2 having been stored previously need not be a background image as in the conventional technique. Also, the design defining information 7 is not defined as design defining information for the background image (serving as the digital image 2 having been stored previously) as in the conventional technique. By the definition of the design defining information 7, it is determined which image among the digital images having been stored previously is to be used in the image composition. As illustrated in FIG. 6, with the conventional technique, in cases where a digital composed image 6, in which a character pattern and a rabbit illustration are embedded, is to be obtained, a digital image 2, in which both of the character pattern and the rabbit illustration have been embedded, must be stored previously as a background image. On the other hand, as illustrated in FIG. 2, with the embodiment of the image composing apparatus in accordance with the present invention, a character pattern and a rabbit illustration can be stored as independent digital images. Therefore, the storage capacity can be reduced. Also, by alteration of the set of the digital images subjected to the image composition, a wide variety of designs can be furnished easily.

The design defining information 7 for defining the design of the digital composed image 6 is described in accordance with a predetermined grammar. Several pieces of design defining information 7 may be prepared for different designs. In this embodiment, the pieces of design defining information 7 are described in a single file together with identifiers for specifying the respective designs, and each of the designs can be selected by the specifying of one of the identifiers. Alternatively, a single piece of design defining information 7 may be described in a single file, and the file may be specified in order to select a design. As the specifying means 4, specifically, the designs which can be selected may be displayed on a cathode ray tube (CRT) display device, which is one of the constitution elements of the aforesaid image reproducing apparatus, and a desired design may be specified from the displayed designs by the customer or the operator by using an input device, such as a keyboard.

How this embodiment functions will be described hereinbelow with reference to FIGS. 3A through 3G, which show an example of the design defining information 7. The example of the design defining information 7 defines a format for negative index editing. (In FIGS. 3A through 3G, the numbers in parentheses are inserted for facilitating the explanation.) The design definition (hereinbelow referred to as the format), which is specified by the specifying means 4 from the design defining information 7, is referred to by the image composing means 5. Lines beginning with # are interpreted as being comments for facilitating the understanding of the information and are ignored. In FIGS. 3A through 3G, besides the format definition, various pieces of information necessary for specifying the format are defined. Therefore, firstly, the various pieces of information will be described hereinbelow.

In FIG. 3A, the "FOR DISPLAY" defining information is defined in order to give a name to each format such that the customer or the photoprinter operator can select desired design defining information with the specifying means 4. In FIG. 3A, FilmKind (1) defines the kind of film. As the kind of film, "0" represents the 135 film, and "1" represents the APS film. Also, Num (2) defines the number of branches of selection with respect to each kind of film. In this example, the number of branches of selection is defined as being 3. For each of the three branches of selection, DispName (3a) and FormatID (3b) are defined. As the branch of selection, DispName (3a) is displayed on the display screen. The specifying means 4 can specify the selected index format by utilizing FormatID (3b), which corresponds to DispName (3a).

In the cases of the 135 film, only the information specified by the specifying means 4 is obtained as the information for determining the design. Therefore, in such cases, reference may be made to the format, which corresponds to FormatID (3b). However, in the cases of the APS film, besides the input from the specifying means 4, the information stored on the film, such as the number of frames, is obtained. Therefore, in the cases of the APS film, the image composing means 5 should preferably determine the design by utilizing both of the input from the specifying means 4 and the information stored on the film. In this embodiment, the cases of the APS film are taken into consideration, and the design is specified in accordance with the design information, which is specified with the specifying means 4, and the frame number information, which is obtained from the film, regardless of the kind of the film.

A definition for associating the specified design information and the frame number information, which is obtained from the film, with the format is made by the "FOR EDIT" defining information, which is shown in FIG. 3A. In the "FOR EDIT" defining information, FormatID (4a) corresponds to FormatID (3b) in the "FOR DISPLAY" defining information. With respect to each FormatID (4a), for each FrameNum (4b), IndexFormatID (4c) for specifying the format is defined. In the example of FIG. 3A, in cases where the A type is specified by the specifying means 4, FormatID=3 in accordance with the "FOR DISPLAY" defining information. Also, in accordance with the "FOR EDIT" defining information, the format is specified such that IndexFormatID=3 if the frame number is 15 frames, such that IndexFormatID=4 if the frame number is 25 frames, and such that IndexFormatID=5 if the frame number is 40 frames.

The formats will be described hereinbelow. Two kinds of formats for the 135 film and six kinds of formats for the APS film are defined by the "FOR EDIT" defining information. Specifically, eight kinds of formats must be defined. In FIG. 3A, the definition of only a portion of the formats is illustrated. By way of example, the definition of an APS-film, 15-frame format, i.e. the definition for IndexFormatID=3, will be described hereinbelow. As illustrated in FIG. 3B, this format is defined by an "SR-Nega 15P" comment line and those that follow.

In FIG. 3B, Width (5) and Height (6) respectively define the number of picture elements along the horizontal direction of the region serving as the basis of image composition and the number of picture elements along the vertical direction of the region. The coordinate system utilized for the definition of the position, at which each image is to be located, is set with respect to the thus defined region. The coordinate system is set such that the left top corner of the region may be taken as the origin, such that the horizontal direction component may become large toward the right from the origin, and such that the vertical direction component may become large toward the bottom from the origin. The region or the coordinate system represents the storage region, which is ensured in association with the picture elements of the digital composed image, and relative positions on the storage region. The region or the coordinate system is defined regardless of the physical size of the formed photographic print. The size of the obtained photographic print depends upon the density of picture elements per mm, with which the digital composed image that is formed in the region is recorded.

Also, BackGroundColor_R (7a), BackGroundColor_G (7b), and BackGroundColor_B (7c) specify the color of the entire area of the aforesaid basic region. In the example of FIG. 3B, all of these items are defined as being 255, and therefore the color of the region is white.

Further, FrameWidth (8) and FrameHeight (9) define the size of each photographic frame, which is contained in the index print. In the index print, the sizes of all frames are equal to one another, and therefore the sizes are defined collectively as illustrated in FIG. 3B. Alternatively, the size may be defined for each of the digital images. As in the aforesaid region, FrameWidth (8) and FrameHeight (9) are defined in terms of the number of picture elements. In the example of FIG. 3B, the number of picture elements along the horizontal direction of each frame is defined as being 320, and the number of picture elements along the vertical direction of each frame is defined as being 182.

Furthermore, Sort (10) defines whether rearrangement of the digital images having been acquired with the film scanner is or is not to be carried out. In this embodiment, when each digital image is acquired with the scanner, information accompanying the digital image is formed. Specifically, for example, in the cases of the APS film, the frame number of each photograph has been recorded on the film, and the photoprinter processes the images by clarifying which frame numbers correspond to which digital image information. In cases where an index print comprising the photographs arranged in an order different from the order, in which they were taken, is to be obtained, rearrangement of the digital images in accordance with a specific algorithm can be carried out by utilizing the frame numbers as reference values. Specifically, Sort (10) defines whether the rearrangement function of the photoprinter is or is not to be utilized, and which algorithm is to be used in cases where the rearrangement function is utilized. In the example of FIG. 3B, Sort (10) is set to be 0, and therefore the rearrangement is not carried out.

The definition of the entire digital composed image is made in the manner described above. How each image subjected to the image composition is defined will be described hereinbelow. In FIG. 3B, Parts Num (11) defines the number of parts contained in the digital images subjected to the image composition. The parts include the digital image, which has been stored previously, the information, which is obtained from the film and is illustrated as a character pattern or a drawing graphic on the digital composed image, and the like. In the example of FIG. 3B, four parts (a bit map pattern, a date character, a numeral representing a film identifier FID, and a bar code representing the film identifier FID) are defined. The number 1 at (11) represents that the definition is the first one in the definitions of the parts.

Each of the parts is defined with PosX (13), PosY (14), Rotation (15), and PartsNo (16). Specifically, PosX (13), PosY (14), Rotation (15), and PartsNo (16) respectively represent the horizontal-direction coordinate of the position, at which the left top point of the part is to be located in the aforesaid basic region, the vertical-direction coordinate of the position, at which the left top point of the part is to be located in the aforesaid basic region, the angle of counter-clockwise rotation of the part, and the identifier for the part. The identifier for the part is the one in an independently registered parts list. The part can be specified by designating the identifier.

How the newly acquired digital image, i.e. each photographic frame, is defined will be described hereinbelow. In FIG. 3B, Frames Num (17) defines the number of photographic frames contained in the index print. In the example of FIG. 3B, the number of frames is 15. As in the parts described above, with respect to each of the 15 frames, the coordinates PosX (19) and PosY (20) and the rotation angle Rotation (21) are defined. In FIG. 3B, the definition of the coordinates and the rotation angle is shown for the first frame alone, and the definition for the second frame and those that follow is not shown. The number 1 at (18) represents the first frame.

As for the photographic frame, the same definition as that for the parts is made, and a format is defined for each of image plane types. The image plane type represents the image range, which is printed when each photographic frame contained in the index print is printed as an ordinary simultaneous print, instead of the index print being formed. The image plane types include a C type, an H type, and a P type. In the index print, the image range can be illustrated with a rectangle superposed upon each frame. An identifier for a rectangle illustrating format, in which the rectangle is to be illustrated in each frame, is defined for each frame. In the example of FIG. 3B, C (22) is defined as being 4, H (23) is defined as being 5, and P (24) is defined as being 6. Specifically, C (22) defined as being 4 means that the rectangle illustrating format for the C type is the format corresponding to the identifier 4. Also, H (23) defined as being 5 means that the rectangle illustrating format for the H type is the format corresponding to the identifier 5. Further, P (24) defined as being 6 means that the rectangle illustrating format for the P type is the format corresponding to the identifier 6. In this embodiment, as for an unexposed frame, only the enclosing border of the frame is illustrated, and N (25) defines a format, in which the enclosing border of the frame is to be illustrated.

A format definition for the frame image, which is specified by the format identifier described above, will be described hereinbelow with reference to FIGS. 3C and 3D. In FIG. 3C, FormatID Num (26) defines the number of format definitions for the frame images. In this example, seven formats (i.e., formats of three image plane types for each of the film kinds, and a format of an unexposed frame regardless of the film kind) are defined. Byway of example, the fourth format illustrated in FIG. 3D will hereinbelow be described in detail.

In FIG. 3D, Width (27) and Height (28) define the width and the height of the digital image having been acquired with the scanner. The width and the height are defined in terms of the number of picture elements. Also, SeeThrough (29) defines whether the processing for a see-through frame is or is not to be carried out in cases where the image to be acquired was not present. Specifically, "1" represents that the see-through frame processing is to be carried out, and "0" represents that the see-through frame processing is not to be carried out. Further, OverlayInfo (30) represents that drawing graphics 1 to 8 are used as the graphics overlaid upon each frame. Kind (31) specifies the kind of the drawing graphic, and "1" specified for Kind (31) means a rectangle. PosX (32) and PosY (33) define the position of the rectangle. The position of the rectangle is not defined as the position relative to the entire image and is defined as the position relative to each digital image (each photographic frame image). The left top corner of the digital image is taken as the origin, and a left top corner of the rectangle is located at the position of a picture element, which is located at PosX along the direction heading from the origin toward the right and at PosY along the direction heading from the origin downwardly. SizeX (34) and SizeY (35) define the width and the height of the rectangle. Color_R (36a), Color_G (36b), and Color_B (36c) specify the color of the rectangle.

Also, Mask (37) specifies whether the character pattern (i.e., C, H, or P) representing the image plane type is or is not to be contained as one of the digital images subjected to the image composition. In cases where it is specified that the character pattern C, H, or P representing the image plane type is to be employed in the image composition, the position of the character pattern is defined with MaskPosX (38) with MaskPosY (39) in the same manner as that for the position of the aforesaid rectangle. The size of the area, in which the character pattern is illustrated, is defined with MaskSizeX (40) and MaskSizeY (41). When necessary, the character pattern can be rotated. The rotation angle is defined with MaskRotation (42). The attribute of the character pattern, such as its font, can be defined. A method for converting the character pattern is defined with MaskConv (43).

Further, Number (44) specifies whether a numeral representing the frame number is or is not to be employed as one of the digital images subjected to the image composition. The position, the size, the rotation angle, and the method of conversion of the numeral representing the frame number are respectively defined with NumberPosX (45), NumberPosY (46), NumberSizeX (47), NumberSize (48), NumberRotation (49), and NumberConv (50).

A definition of parts will be described hereinbelow with reference to FIG. 3E. In FIG. 3E, the parts definition defines the parts, which are specified with PartsNo (16) in FIG. 3B. Parts Num (51) defines the number of parts having been registered. For each of the parts, the kind of the part is defined with Kind (52), and the size of the part is defined with Width (53) and Height (54). Also, in cases where the part is of a bit map, the name of the bit map file is defined with FileName (55). In cases where the part is a character pattern, a method of converting the character pattern is defined with NumberConv (56).

The definition of the method of converting the character pattern will be described hereinbelow. FIGS. 3F and 3G show a conversion table for defining the converting method. ConvTable (57) defines the number of pieces of information for defining the converting method. Each converting method is managed with an identifier TableNo (58). In MaskConv (43) or NumberConv (50) described above, the converting method is specified by using TableNo (58). FileName (59) specifies the name of the data file, in which the character font is defined. The data file is not of the bit map form and is of a raw data form. Each character pattern is specified with an offset from the head of the data file and is fed out. Num (60) represents the number of the character fonts defined in the file, which is specified with FileName (59). For each of the character fonts, converting information (61) is defined. C (62) defines the character. PosX (63) and PosY (64) specify the aforesaid offset. SizeX (65) and SizeY (66) specify the size of each character.

Figure 4:
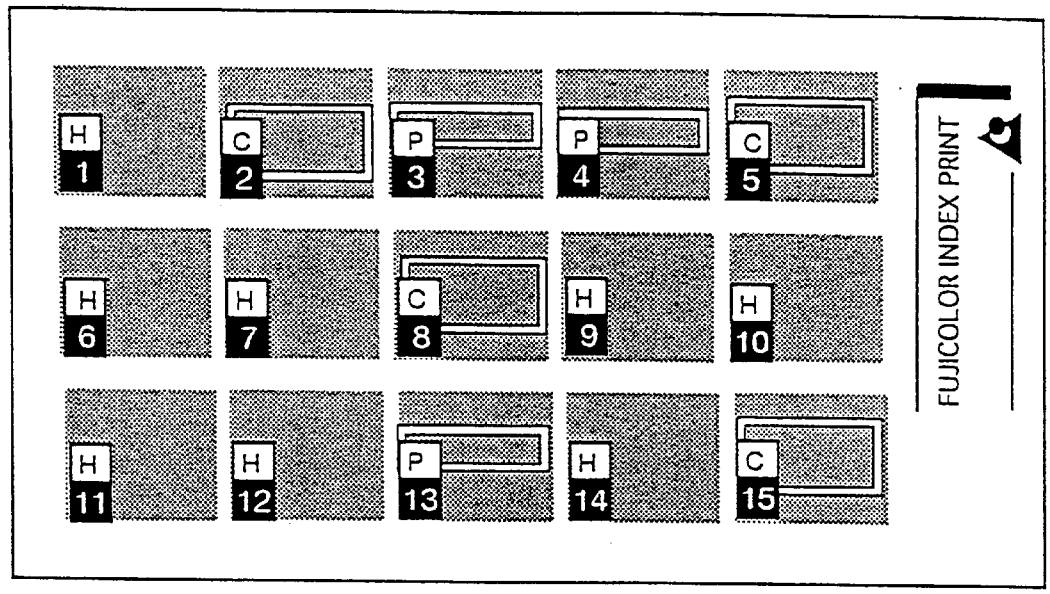
FIG. 4 is an explanatory view showing an example of an index print, which is prepared with the image composing apparatus in accordance with the present invention.

FIG. 4 shows an example of an index print, which is obtained in accordance with the definitions at # SR-Nega 15P in the design defining information shown in FIG. 3B. (In FIG. 3B, a portion of the definitions is not shown.) The bit map pattern embedded at the right in the index print of FIG. 4 is the one defined at # BIT MAP in FIG. 3B.

Figure 5:
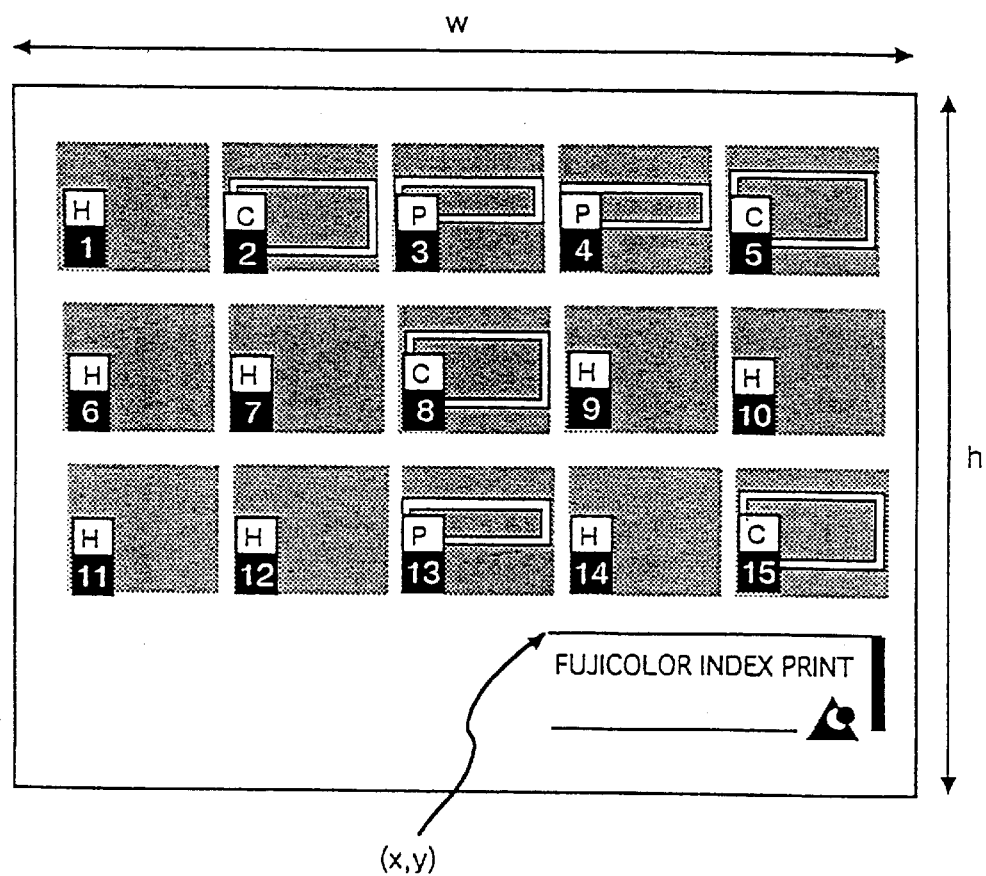
FIG. 5 is an explanatory view showing a different example of an index print, which is prepared with the image composing apparatus in accordance with the present invention.

With the image composing apparatus in accordance with the present invention, for example, in cases where an index print shown in FIG. 5 is to be newly composed from 15 frames and one bit map pattern, which are the same as those in the index print of FIG. 4, it is sufficient for a term of # SR-Nega 15P-2, or the like, to be added below the term of # SR-Nega 15P. In such cases, in the definition of the newly added term # SR-Nega 15P-2, the value of Width (5) at # SR-Nega 15P may be replaced by a region width w shown in FIG. 5, and the value of Height (6) at # SR-Nega 15P may be replaced by a region height h shown in FIG. 5. Also, the value of PosX (13) at # SR-Nega 15P may be replaced by x shown in FIG. 5, and the value of PosY (14) at # SR-Nega 15P may be replaced by y shown in FIG. 5. Further, the value of Rotation (15) at # SR-Nega 15P may be replaced by 0.

In this manner, the design defining information can be altered by the photoprinter operator. For example, new parts can be added, and new defining information employing the new parts can be added. Therefore, each photographic service shop can furnish unique prints (formats) and can flexibly cope with a wide variety of demands of customers.

What is claimed is:

1. An image composing apparatus for composing a composite image from a first digital image and a second digital image, the apparatus comprising:
    i) design defining information including design attribute data selected from the group consisting of a size of the composite image, an identity of the first digital image, a first coordinate-definable position of the first digital image at a first reference point on a coordinate system associated with the composite image, an identity of the second digital image, and a second coordinate-definable position of the second digital image at a second reference point on said coordinate system, the first reference point and the second reference point having any desired spatial relationship to each other;
    ii) specifying means for specifying at least one of the design attribute data for composition of the composite image;
    iii) image composing means for obtaining the composite image of a desired design in accordance with said design defining information consistent with the design data attribute specified by the specifying means, the image composing means incorporating the first digital image and the second digital image into the composite image at the first coordinate-definable position and second coordinate-definable position, respectively.

2. An apparatus as defined in claim 1 wherein said design defining information further includes at least one design attribute data selected from the group consisting of an embeddable character pattern and an embeddable drawing graphic, for embedding in the digital composite image at another coordinate-definable position on said coordinate system.

3. An apparatus as defined in claim 2 wherein said design defining information further includes a parameter defining at least one of the embeddable character pattern and the embeddable drawing graphic.

4. An apparatus as defined in claim 1, wherein the second digital image is a digital image obtained by digitizing a signal from photoelectrically detecting an original image recorded on photographic film or printed matter, and the apparatus further comprises a recording means for recording the composite image as a photographic print on a recording medium.

5. An image composing method for composing
    a composite image from a first digital image and a second digital image, the method comprising the steps of:
    i) preparing design defining information including design attribute data selected from the group consisting of a size of the composite image, an identity of the desired first digital image, a first coordinate-definable position on a coordinate system associated with the composite image for positioning the first digital image at a first reference point, an identity of the desired second digital image, and a second coordinate-definable position on said coordinate system for positioning the second digital image at a second reference point, the first reference point and the second reference point having any desired spatial relationship to each other;
    ii) specifying at least one the design attribute data from the group of design defining information; and
    iii) obtaining the composite image of a desired design in accordance with said specified design defining information by incorporating the first digital image and the second digital image into the composite image at the first coordinate-definable position and second coordinate-definable position, respectively.

6. An image composing apparatus comprising:
    a storage device containing a first digital image having a first coordinate system;
    an image acquirer for acquiring at least one second digital image having a second coordinate system;
    a data storage region having a background coordinate system independent of the first coordinate system and the second coordinate system; and image composing means for composing a composite image from the first digital image and the second digital image and for importing the first digital image and the second digital image into the background storage region at corresponding coordinate-definable locations defined with reference to the background coordinate system such that the first digital image and the second digital image are positioned at a first reference point on the background coordinate system and a second reference point on the background coordinate system, respectively, the first reference point and the second reference point having any desired spatial relationship to each other.

7. The image composing apparatus according to claim 6 wherein the at least one second digital image contains a subject surrounded by minimal background information.

8. The image composing apparatus according to claim 6 wherein the at least one second digital image contains a subject having a size approaching a boundary of the second digital image.

9. The image composing apparatus according to claim 6 wherein the at least one second digital images represents a corresponding subdivision or subdivisions of a single digital image.

10. The image composing apparatus according to claim 6 wherein the data storage region further includes a dynamically configurable background filling areas around the first digital image and the second digital image, the dynamically configurable background having a background color scheme defined by red data, blue data, and green data.

11. The image composing apparatus according to claim 6 wherein the data storage region further includes a textual annotation referenced to one of said coordinate systems.

12. The image composing apparatus according to claim 6 wherein the acquirer further comprises device selected from the group consisting of a scanner, a photoelectric sensor, and a charge-coupled device.

13. A method of composing a composite image comprising the steps of:
    storing a first digital image having a first coordinate system in a storage device;
    acquiring a least one second digital image having a second coordinate system;
    establishing a data storage region having a background coordinate system independent of the first coordinate system and the second coordinate system; and
    composing a composite image from the first digital image and the second digital image and importing the first digital image and the second digital image into the background storage region at corresponding coordinate-definable locations defined with reference to the background coordinate system;
    wherein the composing step includes positioning the first digital image and the second digital image at a first reference point in the background coordinate system and a second reference point in the background coordinate system, respectively, wherein the first reference point and the second reference point have any desired spatial relationship to each other.

14. The method according to claim 13 wherein the acquiring step is accomplished by minimizing background information surrounding the second digital image.

15. The method according to claim 13 wherein acquiring step manipulates the size of a subject to approach a boundary of the second digital image.

16. The method according to claim 13 wherein the acquiring step scans second digital images representing corresponding subdivisions of a single digital image.

17. The method according to claim 13 wherein the establishing step further includes providing a dynamically configurable background filling areas around the first and second digital images, the dynamically configurable background having a background color scheme defined by red data, blue data, and green data.

18. The method according to claim 13 further comprising embedding a textual annotation into the composite image.

* * * * *